(12) United States Patent
Ramnath et al.

(10) Patent No.: US 11,741,151 B1
(45) Date of Patent: *Aug. 29, 2023

(54) INDEXING KEY FRAMES FOR LOCALIZATION

(71) Applicant: Meta Platforms, Inc., Menlo Park, CA (US)

(72) Inventors: Krishnan Ramnath, Fremont, CA (US); Saurabh Mitra, Mountain View, CA (US); Lakshmie Narayan Viswanathan, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,535

(22) Filed: Dec. 22, 2022

Related U.S. Application Data

(63) Continuation of application No. 16/796,859, filed on Feb. 20, 2020, now Pat. No. 11,556,580.

(60) Provisional application No. 62/808,306, filed on Feb. 21, 2019.

(51) Int. Cl.
*G06F 16/53* (2019.01)
*G06V 10/82* (2022.01)
*G06F 16/51* (2019.01)
*G06N 3/08* (2023.01)
*G06F 16/56* (2019.01)
*G06V 20/30* (2022.01)
*G06F 18/22* (2023.01)

(52) U.S. Cl.
CPC .............. *G06F 16/51* (2019.01); *G06F 16/53* (2019.01); *G06F 16/56* (2019.01); *G06F 18/22* (2023.01); *G06N 3/08* (2013.01); *G06V 10/82* (2022.01); *G06V 20/30* (2022.01)

(58) Field of Classification Search
None
See application file for complete search history.

(56) References Cited

U.S. PATENT DOCUMENTS

| | | | |
|---|---|---|---|
| 11,556,580 B1* | 1/2023 | Ramnath | G06F 18/22 |
| 2013/0110841 A1 | 5/2013 | Sathish et al. | |
| 2013/0311163 A1 | 11/2013 | Somekh et al. | |
| 2018/0096555 A1 | 4/2018 | Schtein et al. | |
| 2018/0107689 A1 | 4/2018 | Grossman et al. | |
| 2018/0219814 A1 | 8/2018 | Maarek et al. | |
| 2020/0234062 A1 | 7/2020 | Rogan | |

* cited by examiner

*Primary Examiner* — Bernard Krasnic
(74) *Attorney, Agent, or Firm* — Fenwick & West LLP (57) ABSTRACT

A mobile client device is localized based on a captured image by identifying where the client device is located from a set of known locations. The set of known locations is associated with a set of regions, where each region is associated with a set of key frames representing the important features of the region. Latent vectors and keypoints are calculated for each of the key frames and an image captured by the client device. The system compares the latent vectors of the captured image to the latent vectors associated with the regions to determine a subset of similar regions. The system compares the keypoints of the captured image to the keypoints associated with the regions in the subset to determine a best match. This determined location is considered the region of the client device and may be used with other localization information to maintain localization of the client device.

20 Claims, 4 Drawing Sheets

INDEXING KEY FRAMES FOR LOCALIZATION

CROSS REFERENCE TO RELATED APPLICATIONS

This application is a continuation of U.S. application Ser. No. 16/796,859, filed Feb. 20, 2020, which claims the benefit of U.S. Provisional Application No. 62/808,306, filed Feb. 21, 2019, each of which is incorporated by reference in its entirety.

BACKGROUND

This disclosure relates generally to a localization system, and more specifically to identifying a location based on a captured image.

The use of augmented reality (AR) to overlay virtual objects in the real world has become increasingly popular. Particularly, the use of mobile client devices to render AR objects. Mobile client devices can use their camera to capture the real world and use their display to render AR objects in the view of the real world for a variety of purposes. The mobile client device may need to determine its location to determine what AR object to render and where in the view to render it for the user.

"Localization" or "Relocalization" refers to determining the location of the client device with respect to the world or an area. Relocalization may use various techniques based on sensors of the device to match sensor information with information about the area to be localized to. For example, localization may include matching global positional satellite (GPS) coordinates, WIFI, and image data to known areas. However, these techniques often do not work well to localize to precise locations, such as areas within buildings having various floors and rooms, and may poorly account for error in underlying signals (e.g., due to GPS signal interference, particularly in crowded urban areas).

Hence, a method for quickly and efficiently identifying the mobile client device's location based on the device's camera's view is necessary to enable the implementation of large scale location-based augmented reality.

SUMMARY

A client device captures one or more images of its surroundings, which are processed to generate a set of latent vectors and keypoints describing the images. The latent vectors and keypoints are used to determine the location of a client device relative to locations that are also characterized by latent vectors and keypoints. The client device captures an image or a set of images of its surroundings at an unidentified location. The latent vector(s) and keypoints generated based on the image are used to determine which region of a set of known regions the captured image or set of images is associated with, each known region associated with a more or more latent vectors and keypoints. Similarly, a latent vector and a plurality of keypoints are determined from the captured image. According to one embodiment of the invention, the latent vector of the captured image is compared to the latent vectors of regions of the set of known regions to determine a subset of regions with latent vectors that are similar to that of the captured image. The keypoints of the captured image are compared to the keypoints of the subset of regions to determine a region that most closely matches the captured region. The location of the captured image is identified to be that of the matching region, and related localization information may be used by the device. This approach permits a device to be localized to a region based on images from the device and resolves ambiguities across various regions that is efficient and scalable for a large number of regions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Individual real-world locations may be characterized as regions mapped for device localization. This localization may be used for automated mapping or for interaction with virtual or augmented reality objects related to the region that the device is in. A region is a discrete mapped area corresponding to a real-world location. The map of a region may include a computerized representation of the location, such as boundaries, walls, objects, and other features of the location. Examples of locations that may be discretized as regions include: a particular room (e.g. an office, lobby, or atrium), an outdoor space (e.g. an area within a park or the outside of a building), and a specific venue (e.g. a particular restaurant or a landmark).

Regions are associated with information that can be used to identify the location. In some embodiments the information includes "key frames" which are a set of images from the region that represent the primary characteristics of the location. The information associated with the region also includes a set of latent vectors and keypoints. The latent vectors and keypoints can be determined from the key frames associated with the region. For example, a user may designate a new region, capture a number of images of the region, and those considered to be representative of the region are designated as its key frames. The determination of which images best capture distinctive features of the region and are thereby designated as key frames may be done by the user or may be done automatically by an online system.

Latent vectors are compressed representations of an image associated with a region, particularly in the form of a numeric representation. Consequently, the region as a whole is represented by latent vectors calculated from images associated with the region. In some embodiments the latent vector takes the form of a 200-length floating point vector. The latent vector is calculated using a neural network model, such as a convolutional neural network (CNN). Latent vectors are used to compare the similarity of images. That is, similar images will produce similar latent vectors while different images will produce different latent vectors.

Keypoints are specific points within an image that are readily identifiable and can be characterized by a descriptor of the keypoint. Keypoints, also known as "keypoint descriptors" are one example of a scale-invariant feature transform (SIFT). Images of a region may thus be characterized by the keypoints, which may be substantially the same across different images of the region. Thus, different images of the same location will produce keypoints with the same spacing, and are thereby an immutable property of a region. For example, two different images of the same wall will produce slightly different latent vectors. The keypoints identified in both images will have the same spacing and can thereby be matched up like a thumbprint to identify the location.

Figure 1:
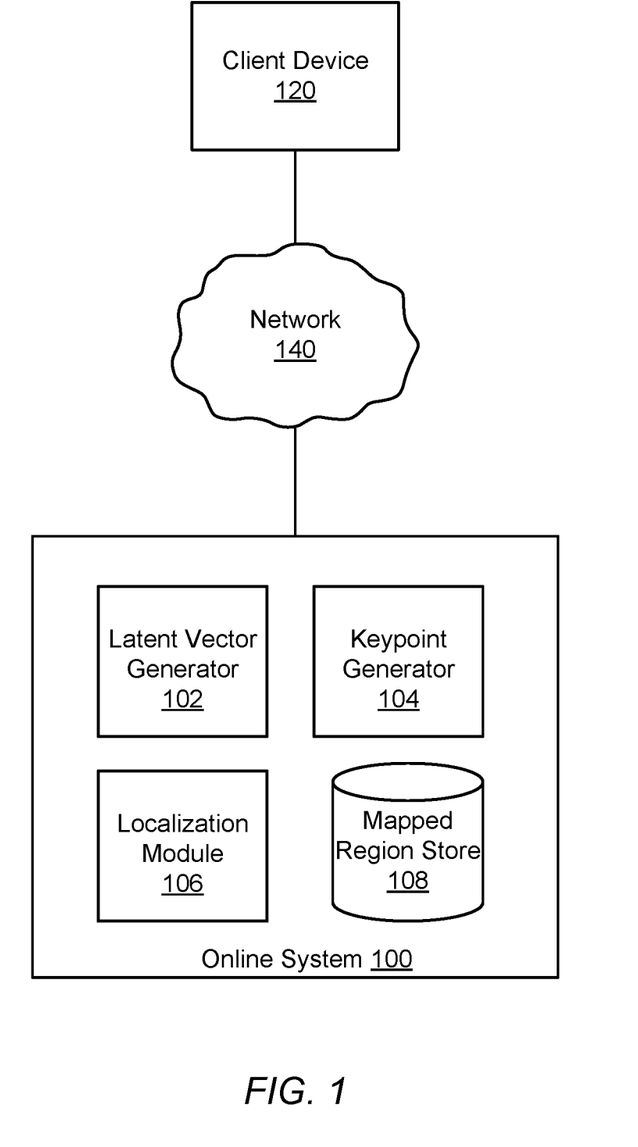
FIG. 1 is a block diagram of a system environment for localizing a client device to a region, according to one embodiment.

An algorithm determines where the keypoints should be located, such as one found within the keypoint generator 104 of FIG. 1. Keypoints indicate distinctive features of an image that are expected to be consistent across different images of the same scene. A desirable quality of a keypoint is invariance, including invariance against factors such as shift, rotation, scaling, and brightness change. For example, a point at a corner of a dark object against a light background is desirable. A point along an edge is not desirable because the point chosen could vary up and down along the edge. Invariance is important so that different images of the same region (e.g. a wall) will produce the same set of key points. The process of extracting keypoints from images is discussed in greater detail with regard to FIG. 2.

The regions and their associated latent vectors and key frames are used to identify individual real-world locations at which an image is captured. The latent vector of the captured image can be compared with latent vectors of all known regions to determine a subset of similar regions (e.g. around 100 candidate regions). The keypoints of the captured image can then be matched against the subset of similar regions to determine which of the regions has keypoints that match the captured image of the client device.

System Architecture

FIG. 1 is a block diagram of a system environment for localizing a client device to a region, according to one embodiment. In this environment, a client device 120 and online system 100 are connected by a network 140. The client device 120 is a mobile computing device that may be localized to a region based on an image captured by the client device 120. Using the image (or data derived therefrom), the online system 100 identifies a mapped region in which the client device 100 is located and provides localization information to the client device 120. The localization information may include information particular to the location, permitting the client device to present content customized to the location. As one example, the localization information may indicate include a three-dimensional virtual map of the region and related virtual content to augment captured images of the region. In this example, the virtual map may include a table in the room for the region, and the virtual content may include a virtual ball to overlay on the image of the table when the table is viewed by the user. The client device 120 is a mobile computing device that may capture images and display content to users, such as a smartphone, tablet computer, laptop or head-mounted display. In general, the client device 120 may be readily moved by a user to different locations, such that the device's location with respect to mapped regions may change over time, and the device may be "localized" to determine the region in which the client device is located. The client device 120 includes an imaging sensor that captures image data of its local real-world surroundings. The client device 120 also includes a display for presenting information the user of the client device 120.

To localize the client device 120, the client device 120 captures one or more images of its real-world surroundings, and sends the image, or information representative of the image therefrom, to the online system 100. As discussed below, this information may include a latent vector representing the image and one or more keypoints identified in the image. The client device 120 receives localization information from the online system 100. The particular localization information may vary according to the particular use of the client device. As one example, an application on the client device provides an augmented reality display to a user, such that content is overlaid on a view of the real-world environment captured by the imaging sensor. The localization information in this example may include a virtual map of the region in which the device is located and the virtual content to be overlaid on the real-world environment, along with characteristics of the environment on which to display the content. After receiving the localization information, the application on the client device may further determine a specific position (i.e., a pose) of the device with respect to the region (e.g., a virtual map of the region) and present an augmented view of the region based on the pose of the device in the region.

The network 140 includes any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The online system 100 includes modules and data stores for identifying a region of a mobile device. In this example, online system 100 includes a latent vector generator 102, a keypoint generator 104, a localization module 106, and a mapper region store 108. The online system 100 receives a request to localize the client device 120 and returns an identified region and related localization information to the client device 120. The request may include the image(s) captured by the client device 120 of the environment of the client device.

The latent vector generator 102 of the online system 100 generates latent vectors from an image. In some embodiments, the latent vector generator 102 is a trained model, such as a neural network model, that may apply several layers of processing to produce the latent vector. The processing layers apply parameters, or weights, to the image data to generate data exiting the layer. In the neural network, each layer has a plurality of nodes, where the nodes receive and process data from a prior layer. For example, the parameters for a layer may define the weighted combination of the nodes that make up another layer of the neural network. The individual layers of the neural network may apply convolutions, pooling, rectification, and neural network functions for processing the prior layer. The individual combination of these functions may be selected by one of skill in the art.

To train the model to generate latent vectors for images, the neural network may be trained to generate similar latent vectors for views of the same area. That is, the neural network may be trained so that a view of an area may provide a similar set of latent values to other views of the same area that are offset or at a different scale, while a view of another area may provide a dissimilar latent value. To evaluate similarity for latent vectors, the values in each place in the latent vector may be combined as a dot product, or as a cosine similarity between the latent vectors. In training, for images of a region (or images that overlap with one another in a region), the target similarity may be set to 1, while the target similarity for other regions may be set to zero, such that the computer model learns weights that generate latent vectors for images that may positively relate to one another.

The keypoint generator 104 generates keypoints from image data inputs. In some embodiments, the keypoint generator 104 uses the method described in relation to FIG. 2 to generate keypoints.

The mapped region store 108 maintains data associated with the plurality of mapped regions. The maintained associated data includes locational data, latent vector data, keypoint data, other identification data for the region, or any combination thereof. In some embodiments, the mapped region store 108 stores key frames associated with each region. The latent vectors associated with the regions are calculated by the latent vector generator 102 from the key frames. The keypoints associated with the regions are calculated by the keypoint generator 104 from the key frames. The data maintained by the mapped region store 108 may be uploaded by users, pre-defined by the online system 100, or some combination thereof. The regions in the mapped region store 108 are indexed and searchable by the associated latent vectors and/or keypoints.

In some embodiments, the mapped region store 108 also maintains a virtual representation of the region, such as a three-dimensional map. The map can be generated by a device in the room that uses image recognition and analysis, such as by a client device of a user who is designating a new region. In one embodiment, the mapped region store 108 contains portions of maps of a region may be associated with or related to other regions. For example, two rooms are adjacent to one another and share a wall. The mapped region store 108 would contain information indicating that these two regions are related to one another in the physical world. Such information would be useful if a client device 120 is located in one room and subsequently moves to the other room.

The localization module 106 determines the location of a client device 120 with respect to the mapped region in mapped region store 108. The localization module 106 may use images captured by the client device 120, latent vectors from the latent vector generator 102, keypoints from the keypoint generator 104, and data associated with regions stored in the mapped region store 108.

When an image is received from the client device, the localization module 106 provides the image to the latent vector generator 102 and keypoint generator 104 to identify a latent vector and one or more keypoints of the image. In some embodiments, latent vector and keypoints for an image are received by the localization module 106 from the request for localization, for example in embodiments in which the client device 120 includes processing for the latent vector generator 102 and keypoint generator 104.

To determine a region in which the client device 120 is located, the localization module 106 first identifies a subset of regions that may be candidates based on the latent vector, and then selects a region from the subset based on the keypoints. The localization module 106 uses the latent vectors to find a subset of regions whose associated latent vectors are similar to the latent vector of the captured image (e.g., have a similarity score above a threshold). In one embodiment, the similarity between the latent vectors is determined by cosine similarity between the latent vectors.

The localization module 106 identifies possible locations. The subset of regions represents candidates of possible locations of the client device 120. The localization module 106 receives a plurality of keypoints associated with the captured image calculated by the keypoint generator 104 and receives the plurality of keypoints associated with regions in the subset of regions from the mapped region store 108. The keypoints are searchable by querying the database of the mapped region store 108. The localization module 106 uses the keypoints associated with each region in the subset of regions to find a plurality of keypoints associated with a region that most closely matches the keypoints associated with the captured image.

The region whose keypoints most closely match the keypoints of the captured image (or set of images) represents the region where the captured image was captured. The localization module 106 accesses the mapped region store 108 to determine the location associated with the matched region. By finding the location of the matched region, the localization module 106 has therefore determined the location at which the image was captured and, consequently, the location of the client device 120 at the time of capture.

In some embodiments, the client device 120 is not connected to the network 140. In these embodiments, the client device 120 contains local versions of the data and modules stored on the online system 100. That is, the client device 120 generates latent vectors, generates keypoints, has a storage of mapped regions, and is therefore able to localize itself without needing a connection to the network 140 or a separate online system 100. The client device 120 uses any of the methods previously disclosed to for the network-enabled embodiments to localize itself. In this embodiment, the client device 120 may localize itself without communicating with the online system 100.

By loosely characterizing images (and known regions) using the latent vectors and confirming a match with keypoints, the location of a device can be quickly determined with fewer errors. The method is scalable to allow make querying the location fast, even on a large scale. For example, the location of an image can be narrowed from a set of several hundred thousand regions to several dozen by latent vectors and subsequently matched by keypoints. Identifying the location of a client device by individually comparing each set keypoints to those of a captured image is time inefficient and impractical when scaled up to include thousands of regions. Additionally, using both keypoints and latent vectors to identify the location of a client device is more accurate than using only keypoints or only latent vectors. For example, to directly search for matches using keypoints alone may both less computationally efficient and likely result in finding regions that are dissimilar when compared with a combined approach.

Figure 2:
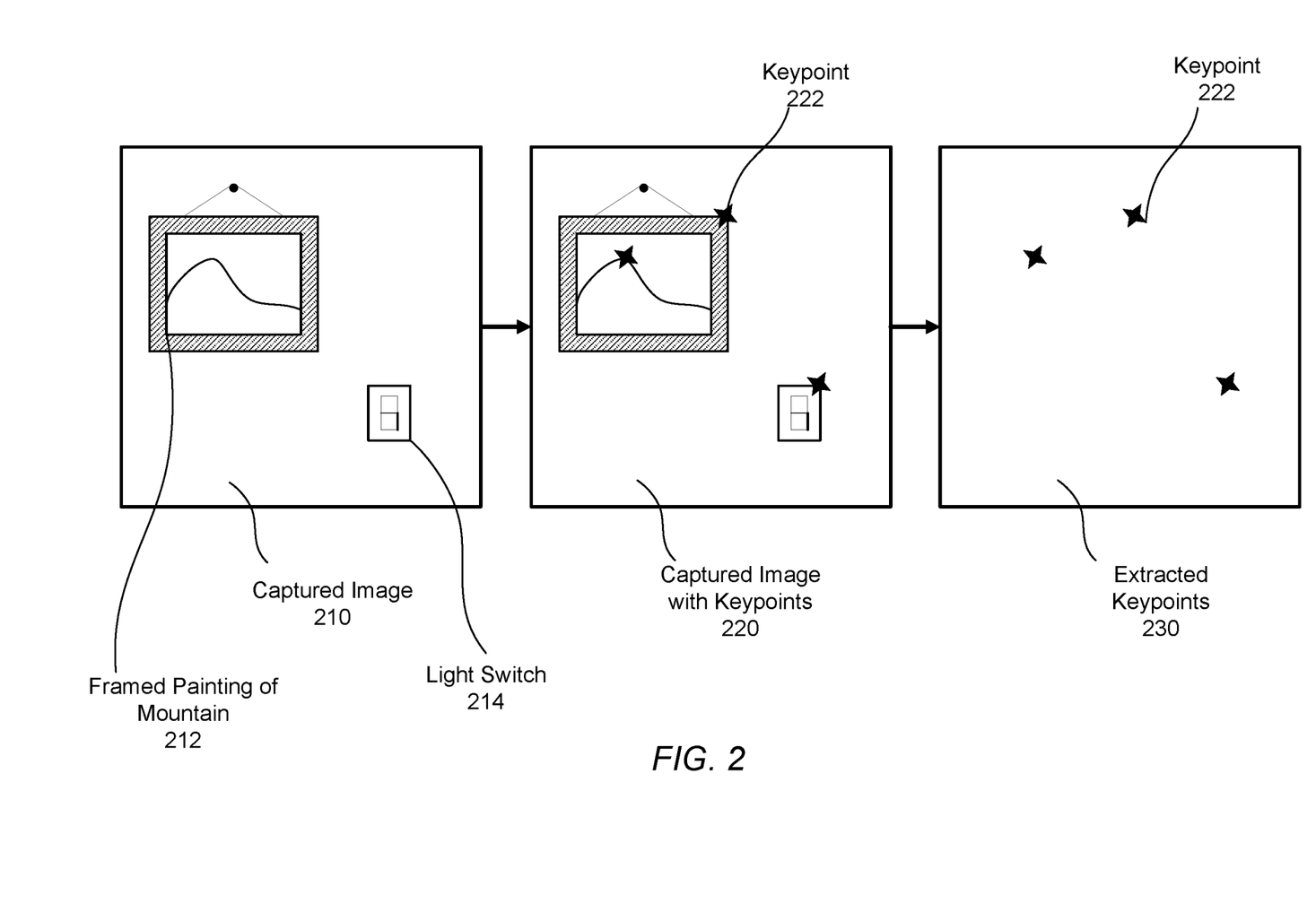
FIG. 2 shows an example visualization of the extraction of keypoints from a captured image, according to an embodiment.

FIG. 2 shows an example visualization of the extraction of keypoints from a captured image, according to an embodiment. For purposes of illustration, FIG. 2 shows a captured image 210, a captured image with keypoints 220, and a set of extracted keypoints 230. The captured image 210 depicts a wall inside a room with a framed painting of a mountain 212 and a light switch 214.

The image with keypoints 220 shows an example of keypoints extracted by an algorithm from the captured image 210. For purposes of illustration, the keypoints 222 are overlaid on the captured image with keypoints 220, as indicated by the four-point stars. The algorithm analyzes the captured image 210 and determines keypoints 222 based on uniquely identifiable points of interest within the image. One determined keypoint 222 is at the top right corner of the framed painting of a mountain 212. The high contrast and sharp right-angled corner between the frame and white wall background make the keypoint 222 invariable. Another keypoint 222 is at the peak of the mountain within the framed painting. A third keypoint 222 is at the top right corner of the light switch 214. These keypoints 222 are also good because they generate a relatively invariant descriptor of the region. These keypoints 222 are shown for purposes of illustration only. Embodiments may have varying numbers of keypoints per image and may be placed in a variety of locations.

FIG. 2 also shows the extracted keypoints 230. As illustrated, the keypoints 222 are positionally the same when the captured image 210 is removed. Data of the positions of the keypoints 222 can be stored and used to compare against other sets of keypoints. Reducing a captured image 210 to extracted keypoints 230 allows for easier comparison to other images.

In an example, a second image may be captured of the same wall with a framed painting with mountains 212 and light switch 214. The second image may be at a slightly different angle and have different lighting. As a result, the second image will produce a similar but slightly different latent vector than the captured image 210. However, the location of the framed painting with mountains 212 and light switch 214 are the same. Therefore, when keypoints are identified for the second image, a set of keypoints extracted from the second image will be characterized the same (e.g., have the same keypoint descriptor) and have the same positional spacing as the extracted keypoints 230. The two sets of keypoints from the first and second image can thereby be matched and confirm that the second picture is of the same wall.

On the contrary, a third image of a similar, but different, wall will produce different key points. It is unlikely that another wall will be found that has the exact same spacing of the framed painting with mountains 212 and the light switch 214 and thereby produce the same set of extracted keypoints 230. The third image may produce a similar latent vector since the walls are similar. However, differences in spacing of objects on the wall will inhibit a keypoint match.

The process of using latent vectors to narrow a search and keypoints to find a best match for a captured image provides an accurate and scalable method for localizing a client device using one or more captured images. The use of latent vectors efficiently limits the search to regions that are quantifiably similar to the captured image. The latent vector step comprehensively eliminates regions that are completely dissimilar to the captured image. Matching the remaining candidates with keypoints allows for more precise characterizations of individual portions of the images to be compared than with use of latent vectors alone. Thereby the process is faster and more precise than by using keypoints or latent vectors alone.

Figure 3:
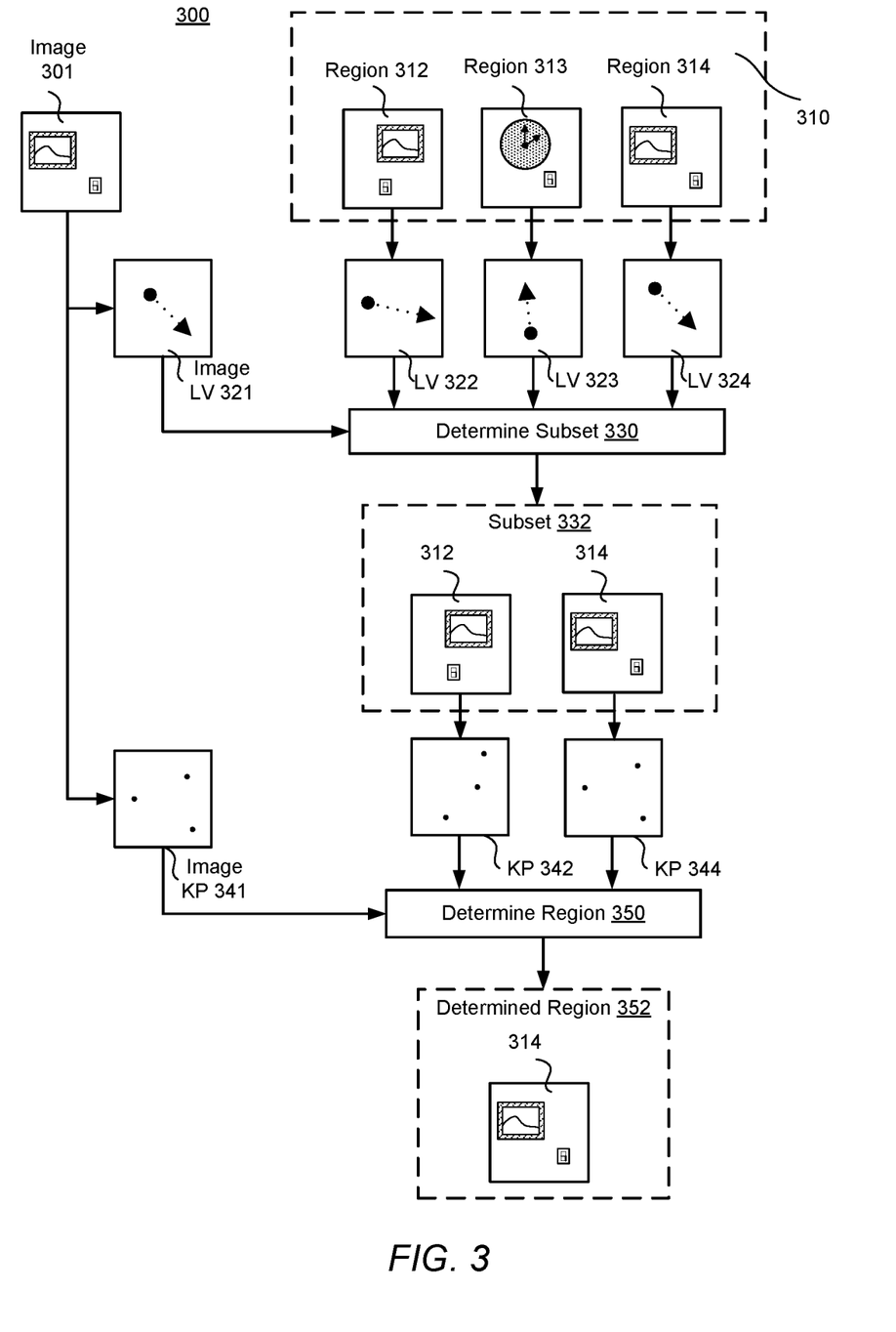
FIG. 3 is an illustration of localizing a client device using a captured image in reference to a set of regions using latent vectors and keypoints, according to an embodiment.

FIG. 3 is an illustration 300 of localizing a client device using a captured image in reference to a set of regions using latent vectors and keypoints, according to an embodiment. An image 301, which has been captured by a client device, such as the client device 120 in FIG. 1 is used to localize the client device with respect to a set of regions 310, comprising region 312, region 313, and region 314. Each region in the set of regions 310 is represented by a key frame, as depicted, that is an image that captures features important to being able to identify the region.

A latent vector 321 and key points 341 may be determined for the image 301. As discussed above, these may be determined by online system 100 or by the client device 120.

The image latent vector 321 is compared to the latent vectors associated with the set of regions to determine 330 a subset 332 of candidate regions. The online system 100 compares the image latent vector 321 to the latent vector 322 associated with region 312 and determines 330 the two vectors to be similar. Consequently, region 312 is added to the subset 332. As seen by comparing region 312 to the image 301, the two are visually similar and both contain the same framed painting of a mountain as well as a light switch. Therefore, in this example the visually similar image 301 and region 312 produce similar latent vectors. The online system 100 follows a similar comparison of the image latent vector 321 to the latent vector 324 of region 314 and obtains a similar result. The region 314 is also added to the subset 332.

The system 300 also compares the image latent vector 321 to latent vector 323 associated with region 313. As seen by comparing region 313 to the image 301, the two are visually distinct. The region 313 contains a round clock while the image 301 contains no round objects. The image latent vector 321 and latent vector 323 are dissimilar within the latent space and thus have a low similarity score. The system 300 determines 330 the vectors to not be similar and does not add region 313 to the subset 332.

From the subset 332 of candidate regions, the system 300 determines 350 a region that is a best match for the image 301 based on keypoints. In some embodiments, the system 300 receives the keypoints. In other embodiments, the system 300 calculates the keypoints for some or all of the regions comprised within the subset 332 of regions and image 301.

The system 300 compares the image keypoints 341 with the keypoints 342 associated with region 312. The image keypoints 341 do not match up well with the keypoints 342. As can be seen by visually comparing the image 301 and the key frame of region 312, the positions of the keypoints in these two images would not line up. Keypoints are typically at corners and areas of high contrast. The position of the corners of the framed painting and light switch in region 312 are very different from that in the image 301. Each keypoint is associated with a numeric descriptor. For example, the keypoints are characterized with some value that represents their position in a vector space, such as Cartesian coordinate values. The numeric descriptors associated with key points are the same for the same features captured in different images. The numeric descriptors are different values for different sets of features. Consequently, the image keypoints 341 and keypoints 342 at positionally distinct and when compared do not match up. The system 300 determines 350 that the image 301 was not taken at the location associated with region 312.

The system 300 compares the image keypoints 341 with the keypoints 344 associated with region 314. The system 300 determines 350 the keypoints 344 most closely match the image keypoints 341. That is, of all the regions within the subset 332, the keypoints 344 associated with region 314 most closely match the image keypoints 341. The position of the framed painting and light switch within the key frame of region 314 closely resemble that within the image 301. Hence the keypoints 344 closely resemble the image keypoints 341. Therefore, the localization module 106 can determine that region 314 is the determined region 352 and further that the location associated with the region 314 is determined to be the location at which the image 301 was captured.

The examples disclosed in relation to FIG. 3 are for illustration only and are not intended to be limiting. Various combinations of the disclosed methods may be used to determine a region that most closely matches the captured image 301.

Figure 4:
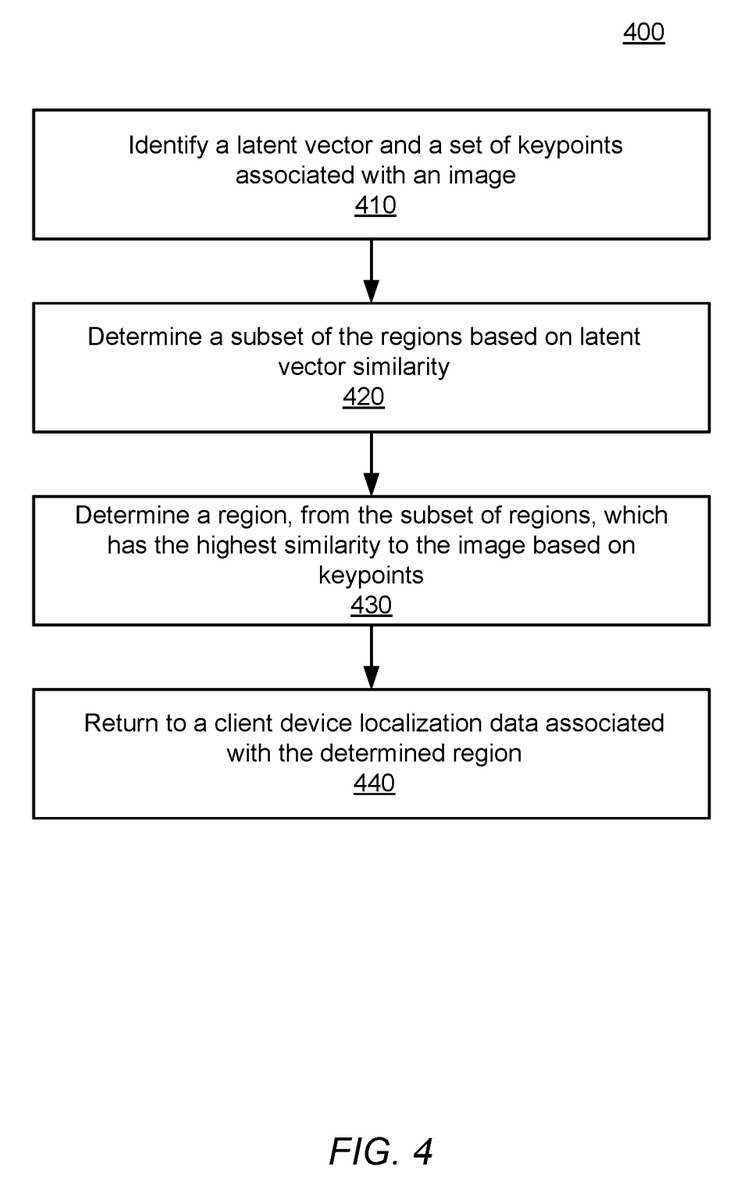
FIG. 4 is a flowchart of a process of localization, according to an embodiment.

FIG. 4 is a flowchart of a process 400 of localization, according to an embodiment. The process 400 may include different or additional steps than those described in conjunction with FIG. 4 in some embodiments or perform steps in different orders than the order described in conjunction with FIG. 4.

A process 400 identifies 410 a latent vector and a set of keypoints associated with an image. In some embodiments, the process 400 is performed by a localization system, such as the online system 100 of FIG. 1. The image is captured by a camera of a mobile client device. In some embodiments, the identification of the latent vectors and set of keypoints associated with the image occurs by the process 400 calculating the latent vector and keypoints. In other embodiments, the process 400 receives the latent vectors and keypoints.

For each latent vector and set of keypoints associated with an image identified by the process 400, the process 400 determines 420 a subset of regions based on latent vector similarity. The subset of regions is determined 420 from a larger set of regions. Each region in the set of regions is associated with a location as well as one or more key frames. From each key frame, a latent vector and set of keypoints can be determined. In some embodiments, the process 400 calculates the latent vectors and sets of keypoints associated with each region. In other embodiments, the process 400 receives the latent vectors and sets of keypoints.

The process 400 determines 420 the subset of regions based on a comparison between of the latent vector associated with the image and the latent vectors associated with the regions. The latent vectors are indexed and searchable. The comparison between the latent vectors may be based on determining a tolerance value of similarity between the latent vectors.

The process 400 determines 430 a region, from the subset of regions, which has the highest similarity to the image based on keypoints. The sets of keypoints associated with the regions are compared against the keypoints associated with the image. The sets of keypoints are indexed and searchable. The comparison between the sets of keypoints results in determining 430 a region whose associated keypoints most closely match the keypoints associated with the image.

The process 400 returns 440 the determined region to a client device. Specifically, the process 400 returns 440 localization data associated with the determined region. Localization data includes information used to identify the location of the region, such as global positioning satellite (GPS) data or other location mapping data. The client device to which the information is returned 440 may be different from the client device that captured the image.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method comprising:
    receiving an image taken by a client device at an unidentified geographical location;
    extracting a latent vector from the received image;

extracting a set of keypoints from the received image;
accessing a database that stores, for each of a plurality of reference images taken at a known geographical location from a plurality of known geographical locations, a latent vector and a set of keypoints generated from the reference image;
matching a reference image of the plurality of reference images to the received image by:
comparing the extracted latent vector from the received image to the latent vector of each of the plurality of reference images, and
comparing the extracted set of keypoints from the received image to the set of keypoints for the matching reference image; and
returning, for the received image, localization data associated with the client device, wherein the localization data comprises the known geographical location of the matching reference image.

2. The method of claim 1, wherein extracting a latent vector from the received image comprises calculating the latent vector by processing the received image using a neural network model.

3. The method of claim 1, wherein extracting a set of keypoints from the received image comprises calculating scale-invariant feature point descriptors of points in the received image.

4. The method of claim 1, wherein each geographical location of the plurality of geographical locations is associated with a plurality of key frames comprising images captured within the respective known geographical location.

5. The method of claim 4, wherein the latent vector for a known geographical location of the plurality of geographical locations is determined based on the key frames associated with the respective known geographical location.

6. The method of claim 4, wherein the keypoints for a known geographical location of the plurality of geographical locations are determined from a set of key frames associated with the respective known geographical location.

7. The method of claim 1, wherein the localization data for the known geographical location of the matching reference image further comprises three-dimensional mapping data describing the known geographical location.

8. The method of claim 1, wherein comparing the extracted latent vector from the received image to each of the latent vectors from the plurality of reference images comprises determining a cosine similarity between the extracted latent vector from the received image and each of the latent vectors.

9. A non-transitory computer-readable medium having instructions for execution by a processor to perform steps comprising:
receiving an image taken by a client device at an unidentified geographical location;
extracting a latent vector from the received image;
extracting a set of keypoints from the received image;
accessing a database that stores, for each of a plurality of reference images taken at a known geographical location from a plurality of known geographical locations, a latent vector and a set of keypoints generated from the reference image;
matching a reference image of the plurality of reference images to the received image by:
comparing the extracted latent vector from the received image to the latent vector of each of the plurality of reference images, and
comparing the extracted set of keypoints from the received image to the set of keypoints for the matching reference image; and
returning, for the received image, localization data associated with the client device, wherein the localization data comprises the known geographical location of the matching reference image.

10. The non-transitory computer-readable medium of claim 9, wherein extracting a latent vector from the received image comprises calculating the latent vector by processing the received image using a neural network model.

11. The non-transitory computer-readable medium of claim 9, wherein extracting a set of keypoints from the received image comprises calculating scale-invariant feature point descriptors of points in the received image.

12. non-transitory computer-readable medium of claim 9, wherein each geographical location of the plurality of geographical locations is associated with a plurality of key frames comprising images captured within the respective known geographical location.

13. The non-transitory computer-readable medium of claim 12, wherein the latent vector for a known geographical location of the plurality of geographical locations is determined based on the key frames associated with the respective known geographical location.

14. The non-transitory computer-readable medium of claim 9, wherein the localization data for the known geographical location of the matching reference image further comprises three-dimensional mapping data describing the known geographical location.

15. The non-transitory computer-readable medium of claim 9, wherein comparing the extracted latent vector from the received image to each of the latent vectors from the plurality of reference images comprises determining a cosine similarity between the extracted latent vector from the received image and each of the latent vectors.

16. A system comprising:
a processor; and
a non-transitory computer-readable medium having instructions which, when executed by the processor, cause the processor to perform steps comprising:
receiving an image taken by a client device at an unidentified geographical location;
extracting a latent vector from the received image;
extracting a set of keypoints from the received image;
accessing a database that stores, for each of a plurality of reference images taken at a known geographical location from a plurality of known geographical locations, a latent vector and a set of keypoints generated from the reference image;
matching a reference image of the plurality of reference images to the received image by:
comparing the extracted latent vector from the received image to the latent vector of each of the plurality of reference images, and
comparing the extracted set of keypoints from the received image to the set of keypoints for the matching reference image; and
returning, for the received image, localization data associated with the client device, wherein the localization data comprises the known geographical location of the matching reference image.

17. The system of claim 16, wherein extracting a latent vector from the received image comprises calculating the latent vector by processing the received image using a neural network model.

18. The system of claim 16, wherein extracting a set of keypoints from the received image comprises calculating scale-invariant feature point descriptors of points in the received image.

19. The system of claim 16, wherein each geographical location of the plurality of geographical locations is associated with a plurality of key frames comprising images captured within the respective known geographical location.

20. The system of claim 19, wherein the latent vector for a known geographical location of the plurality of geographical locations is determined based on the key frames associated with the respective known geographical location.

* * * * *